US012625292B2

(12) United States Patent
Chang et al.

(10) Patent No.: US 12,625,292 B2
(45) Date of Patent: May 12, 2026

(54) SLIM SONIC LOGGING TOOL WITH MULTIPLE MODULES FOR BOREHOLE RESONANCE MODE AND PITCH-CATCH MEASUREMENT

(71) Applicant: Halliburton Energy Services, Inc., Houston, TX (US)

(72) Inventors: Chung Chang, Houston, TX (US); Gary Wayne Kainer, Tomball, TX (US); Jing Jin, Singapore (SG); Ruijia Wang, Singapore (SG); Xiang Wu, Singapore (SG); Keith Bellman, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 149 days.

(21) Appl. No.: 18/292,071

(22) PCT Filed: Jun. 24, 2022

(86) PCT No.: PCT/US2022/035000
§ 371 (c)(1),
(2) Date: Jan. 25, 2024

(87) PCT Pub. No.: WO2023/075870
PCT Pub. Date: May 4, 2023

(65) Prior Publication Data
US 2024/0288600 A1 Aug. 29, 2024

Related U.S. Application Data

(60) Provisional application No. 63/271,773, filed on Oct. 26, 2021.

(51) Int. Cl.
*G01V 1/52* (2006.01)
(52) U.S. Cl.
CPC .......... *G01V 1/523* (2013.01); *G01V 2200/16* (2013.01); *G01V 2210/121* (2013.01);
(Continued)
(58) Field of Classification Search
CPC ............... G01V 1/523; G01V 2200/16; G01V 2210/121; G01V 2210/1299; G01V 2210/1429
See application file for complete search history.

(56) References Cited

U.S. PATENT DOCUMENTS

| | | | | |
|---|---|---|---|---|
| 2006/0233047 A1* | 10/2006 | Zeroug | .................... | G01V 1/44 367/25 |
| 2013/0163387 A1* | 6/2013 | Mandal | .................. | G01V 1/159 310/332 |

(Continued)

OTHER PUBLICATIONS

International Search Report & Written Opinion; PCT Application No. PCT/US2022/035000; mailed Oct. 19, 2022.

*Primary Examiner* — Krystine E Breier
(74) *Attorney, Agent, or Firm* — NOVAK DRUCE CARROLL LLP

(57) ABSTRACT

The invention relates to a slim sonic logging tool with multiple modules for borehole resonance mode and pitch-catch measurement, comprising a cylindrical housing, a monopole transmitter, a pair of cross-dipole transmitters and a ring of receivers disposed between the monopole transmitter and the pair of cross-dipole transmitters within the cylindrical housing, the ring of receivers, being axially around a circumference of the first cylindrical housing.

21 Claims, 12 Drawing Sheets

(52) U.S. Cl.
CPC ................ *G01V 2210/1299* (2013.01); *G01V 2210/1429* (2013.01)

(56) References Cited

U.S. PATENT DOCUMENTS

| | | | |
|---|---|---|---|
| 2015/0219780 A1 | 8/2015 | Zeroug et al. | |
| 2015/0240629 A1* | 8/2015 | Wu ......................... | G01V 3/34 |
| | | | 702/11 |
| 2015/0293251 A1* | 10/2015 | Kinoshita ................ | G01V 1/44 |
| | | | 367/25 |
| 2017/0168179 A1 | 6/2017 | Lemarenko et al. | |
| 2018/0149019 A1* | 5/2018 | Bose ........................ | G01V 1/50 |
| 2018/0372902 A1 | 12/2018 | Han et al. | |
| 2019/0346581 A1* | 11/2019 | Boyd ..................... | G01V 1/284 |
| 2021/0123731 A1* | 4/2021 | Chang ................... | G01B 17/02 |

* cited by examiner

SLIM SONIC LOGGING TOOL WITH MULTIPLE MODULES FOR BOREHOLE RESONANCE MODE AND PITCH-CATCH MEASUREMENT

CROSS-REFERENCE TO RELATED APPLICATIONS

This application claims the benefit of PCT Application NO. PCT/US2022/035000 filed Jun. 24, 2022, which claims benefit of Provisional Application No. 63/271,773, filed Oct. 26, 2021, for "SONIC LOGGING TOOLS FOR SLIM HOLE TOOLS AND PULSE-ECHO MEASUREMENTS," which are incorporated herein by reference.

FIELD

Sonic logging tools adapted for operation in slim holes and sonic logging tools for operating in pulse-echo resonant modes.

BACKGROUND

There are many engineering challenges associated with operation of a slim hole sonic tool. One engineering challenge is that the number of azimuthal receivers of a slim hole sonic tool is limited by available space depending upon the tool outer diameters. As a result, fewer azimuthal receivers limit the measurement azimuthal sampling and corresponding angular resolution. Another engineering challenge is that even if a slim hole sonic tool includes more than one receiver, it is still difficult to match receivers that have identical sensitivity of amplitude and spectrum. This is important, as matched receivers are often needed in order to attribute the response differences as borehole environmental changes and adequately interpret the results.

Further, there are many borehole resonant modes that are applicable for sonic logging tools. Such resonant modes can depend on numerous factors including the well configurations with tubing, casing, or an absence of tubing and casing, as well as transmitter and receiver positioning. Most of the borehole modes can propagate along the depth directions. However, there are various applications where it is desirable to propagate along other directions and measure other conditions. For example, to map the through tubing cement condition (TTCE) it is desirable to measure those borehole modes that not only are localized for a better vertical resolution but also sensitive to cement conditions.

BRIEF DESCRIPTION OF THE DRAWINGS

Implementations of the present technology will now be described, by way of example only, with reference to the attached figures, wherein.

DETAILED DESCRIPTION

Figure 1:
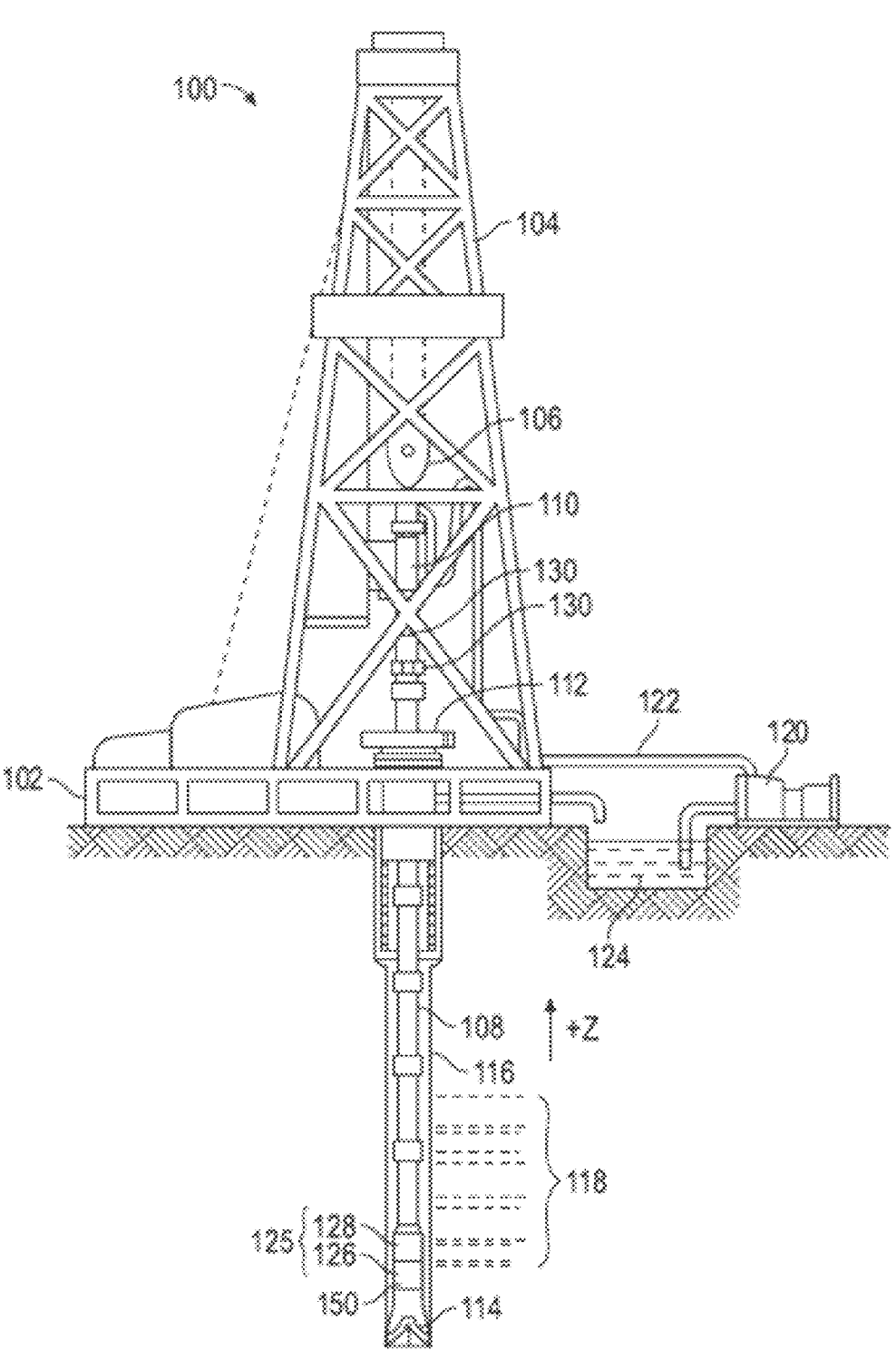
FIG. 1 illustrates a diagrammatic view of an exemplary logging while drilling (LWD) and/or measurement while drilling (MWD) borehole operating environment in which the present disclosure can be implemented, in accordance with some examples.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features of the present disclosure.

Sonic logging tools can have a longer transmitter to receiver distance in order to separate different traveling speed events in the time domain recording. In turn, each measured event can be extracted and evaluated for well mechanical property interpretations. However, there are well logging applications, e.g. TTCE, where the tubing reverberating signals overwhelm signals of interest. Accordingly, a traditional tool, e.g. cement bond log (CBL) tool, is not able to operate in such a measurement environment. Furthermore, well access can restrict along the well to prevent deployment of a larger diameter tool for such a measurement environment. In particular, the requirements of a slim hole replace additional limitations for a slim hole tool in terms of electrical power, telemetry rate, pulling and pushing strengths, etc.

The breathing mode of casing can be influenced by the presence or absence of cement. There are two types of casing vibrating modes. A first mode is associated more with compressional waves while a second mode is associated more with flexural waves. The disclosed technology addresses the foregoing and is configured for TTCE applications by integrating transmitter(s) and receiver(s) that are placed close together in order to excite and detect the casing breathing mode. More specifically, a tool integrates a mono-pole transmitter and a pair of dipole transmitters to excite both modes.

Sonic logging tools are typically engineered and built for specific applications. Specifically, service companies typically build many different sonic tools according to market needs. For example, in wireline logging services, long spacing sonic measurements require a very specific tool that is not configured for other applications. This leads to the wasting of resources due to the costs associated with designing and maintaining many different types of sonic tool. However, sonic tools can be designed for operation across various applications. For example, a slim sonic tool can be converted into a leak detection tool by turning off transmitter and using only the receiver listening measurements if the tool is designed for such a convers 10n.

The disclosed technology addresses the foregoing and the previously described issued related to operation in a slim hole environment, by creating a slim hole acoustic tool with two measurement modules-a borehole resonance mode measurement module and a pitch-catch measurement module. Each measurement module has a corresponding transmitter and receivers and are configured to measure different types of measurements. A motor can be integrated with a receiver of a measurement module to provide 360 degrees of azimuthal sampling. The two measurement modules can be configured to operate independently from each other or in combination (e.g., a transmitter of the borehole resonance mode measurement module with the dense acoustic array of the pitch-catch measurement module) in order to perform traditional borehole sonic logging.

Some aspects of the disclosed technology can be utilized in downhole tools for logging while drilling (LWD) applications. However, as will be discussed in further detail, other types of environments including measurement while drilling (MWD) or wireline wellbore environments are similarly applicable.

FIG. 1 illustrates a diagrammatic view of an exemplary logging while drilling (LWD) and/or measurement while drilling (MWD) borehole operating environment 100 in which the present disclosure can be implemented. A drilling platform 102 is equipped with a derrick 104 that supports a hoist 106 for raising and lowering a drill string 108. The hoist 106 suspends a top drive 110 suitable for rotating the drill string 108 and lowering the drilling string 108 through the well 112. Connected to the lower end of the drill string 108 is a drill bit 114 which creates a borehole 116 by rotating and passing through various geological formations 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the borehole 116 into the pit 124 and aids in maintaining the integrity of the borehole 116. Various materials can be used for drilling fluid, including oil-based fluids and water-based fluids.

Logging tools 126 can be integrated into a bottom-hole assembly 125 near the drill bit 114. As the drill bit 114 extends the borehole 116 through the formations 118, logging tools 126 collect measurements relating to various formation properties as well as tool and/or other drilling conditions. The bottom-hole assembly 125 can also include a telemetry sub 128 to transfer measurement data to a surface receiver 130 and to receive commands from the surface. In some embodiments, the telemetry sub 128 does not communicate with the surface, but rather stores logging data for later retrieval at the surface when the logging assembly is recovered.

Each of the logging tools 126 can include multiple tool components, spaced apart from each other, and communicatively coupled with one or more wires. Logging tools 126 can include, for example, sonic receivers and/or emitters for performing acoustic measurements of the borehole 116. The telemetry sub 128 can include wireless telemetry or logging capabilities, or both, such as to transmit or later provide information indicative of received acoustic energy/waveforms (e.g., pressure waves, etc.) to operators on the surface or for later access and data processing for the evaluation of formation 118 properties.

The logging tools 126, including the acoustic logging tool, may also include one or more computing devices 150 communicatively coupled with one or more of the pluralities of tool components. The computing device 150 may be configured to control or monitor the performance of the tools 126, process logging data, and/or carry out the methods of the present disclosure.

In some embodiments, one or more of the logging tools 126 may communicate with a surface receiver 130, such as wired drillpipe. In other cases, the one or more of the logging tools 126 can communicate with a surface receiver 130 by wireless signal transmission. In at least some cases, one or more of the logging tools 126 may receive electrical power from a wire that extends to the surface, including wires extending through a wired drillpipe. In at least some instances the methods and techniques of the present disclosure may be performed by a computing device (not shown) located on the surface. In some embodiments, the computing device may be included in the surface receiver 130. For example, surface receiver 130 of the wellbore operating environment 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub 128 or both, until it is retrieved for processing.

Figure 2:
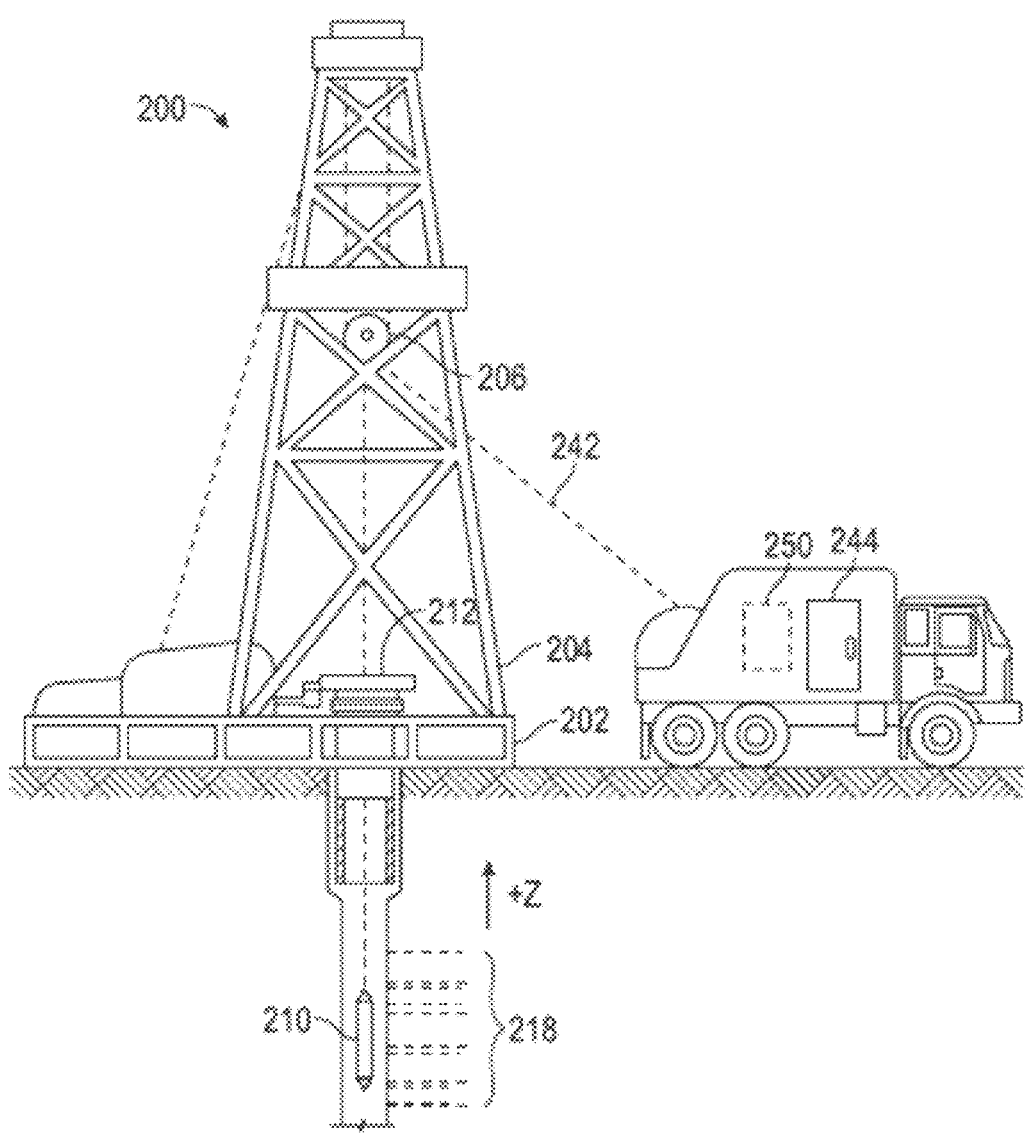
FIG. 2 illustrates a diagrammatic view of a conveyance logging borehole operating environment, in accordance with some examples.

FIG. 2 illustrates a diagrammatic view of a conveyance logging (WL) borehole operating environment 200 (also referred to as "wireline" in the field) in which the present disclosure can be implemented. A hoist 206 can be included as a portion of a platform 202 which is coupled to a derrick 204. The hoist 206 may be used to raise or lower equipment such as acoustic logging tool 210 into or out of a borehole. Acoustic logging tool 210 can include, for example, sonic receivers and/or emitters for performing acoustic measurements of the borehole. A conveyance 242 provides a communicative coupling between the acoustic logging tool 210 and a logging facility 244 at the surface. The conveyance 242 may include wires (one or more wires), slicklines, cables, or the like, as well as tubular conveyances such as coiled tubing, joint tubing, or other tubulars, and may include a downhole tractor. Additionally, power can be supplied via the conveyance 242 to meet power requirements of the tool. The acoustic logging tool 210 may have a local power supply, such as batteries, downhole generator and the like. When employing non-conductive cable, coiled tubing, pipe string, or downhole tractor, communication may be supported using, for example, wireless protocols (e.g. EM, acoustic, etc.), and/or measurements and logging data may be stored in local memory for subsequent retrieval. The logging facility 244 may include a computing device 250 able to carry out the methods and techniques of the present disclosure. Data regarding a formation 218 can be obtained by acoustic logging tool 210 and processed by computing device 250. In some embodiments, computing device 250 may be equipped to process received information in substantially real-time. In some embodiments, computing device 250 may store the received information for later retrieval and processing, either on-site or elsewhere.

Figure 3:
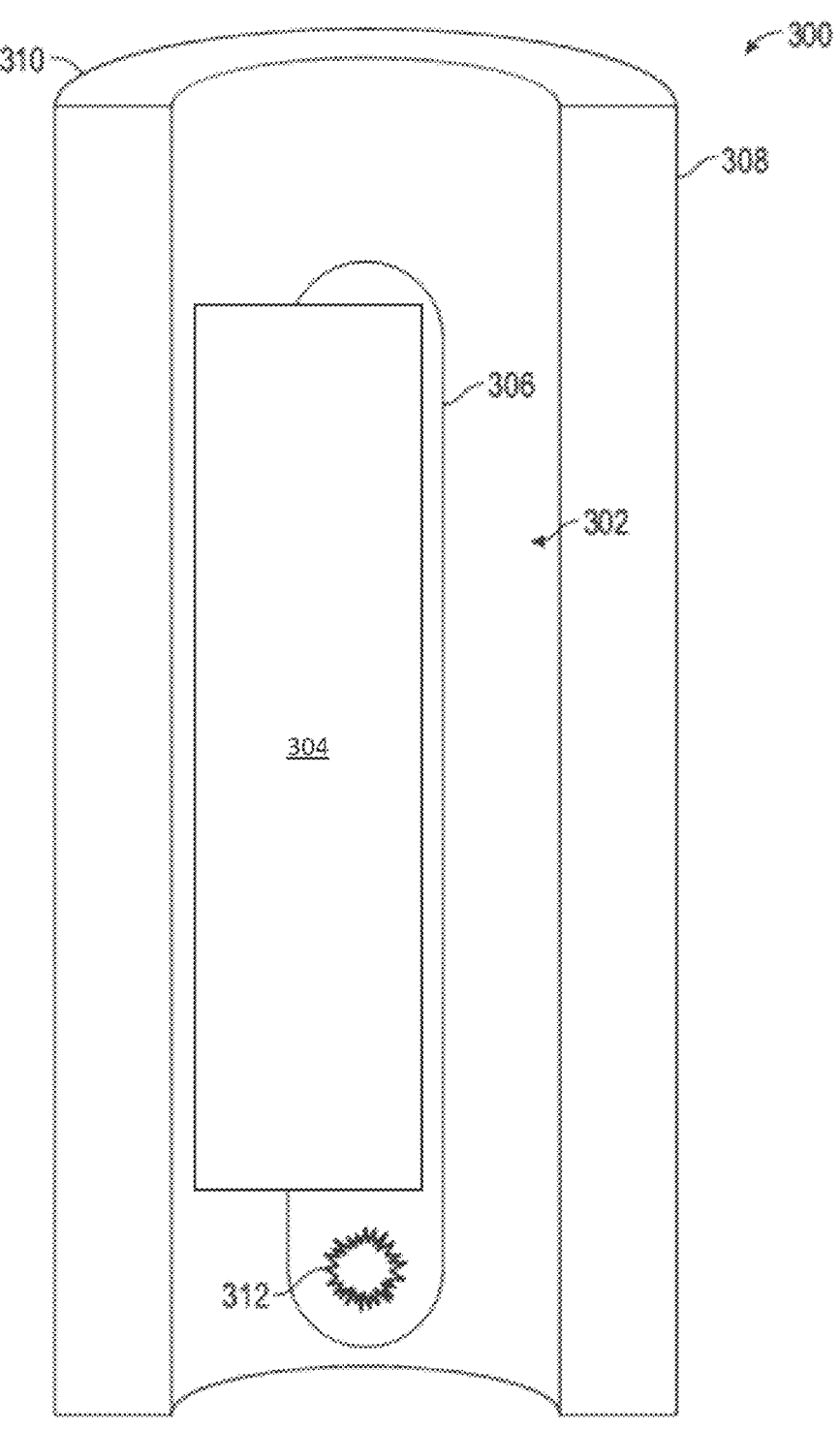
FIG. 3 illustrates a diagrammatic view of a borehole operating environment model which may be used by the methods of the present disclosure, in accordance with some examples.

FIG. 3 illustrates a diagrammatic view of a borehole operating environment model 300 which may be used by the methods of the present disclosure. The borehole operating environment model 300 includes a fluid-filled borehole 302 which extends down from a surface 310 and may be filled with mud, drilling fluid, and other fluid materials. A sonic logging tool 306 is included within the fluid-filled borehole 302 and can be a WL sonic logging tool or an LWD sonic logging tool. A formation 308 is further included in the borehole operating environment model 300 and surrounds the fluid-filled borehole 302.

The sonic logging tool 306 can measure refracted and guided waves propagating along sidewalls of the fluid-filled borehole 302. Acoustic properties of the formation 308 can then be extracted (e.g., derived) from the measured waves. More particularly, the sonic logging tool 306 includes an acoustic emitter 312 which can excite acoustic waves for one or more receivers 304 along the sonic logging tool 306. Further, data regarding the fluid-filled borehole 302 and surrounding formation 308 can be determined by various characteristics of a wave propagation detected by the one or more receivers 304, e.g. receiving the wave in sequence. For example, a time delay between a plurality of receivers or a single moving receiver may be used to determine various characteristics of the medium through which the wave propagated (e.g., the fluid-filled borehole 302 or formation 308).

The sonic logging tool can excite and capture borehole guided waves such as, for example and without imputing limitation, flexural waves for WL logging, screw waves for LWD logging, and leaky-P waves for a soft formation. The captured borehole guided waves can then be used to measure acoustic properties of the formation 308, such as formation body compressional slowness and body shear wave slowness.

Figure 4:
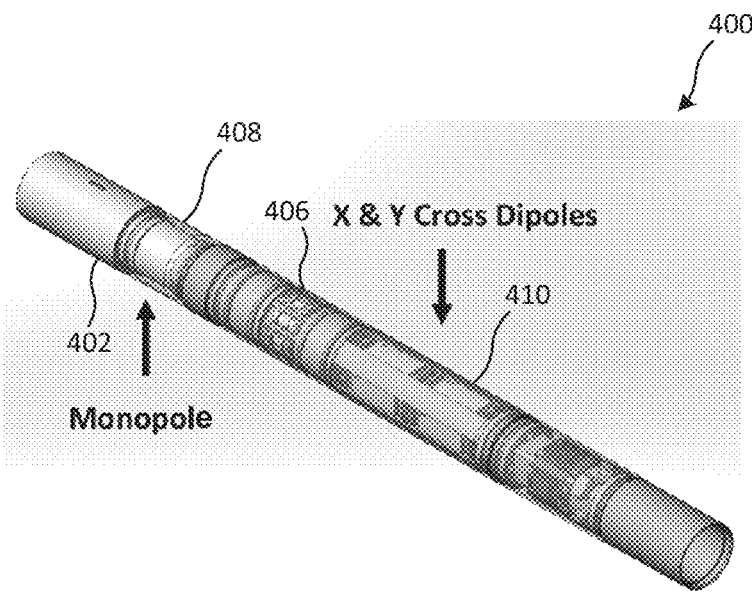
FIG. 4 illustrate a perspective view of a borehole resonance mode measurement module, in accordance with some examples.

FIG. 4 illustrate a perspective view of a borehole resonance mode measurement module 400 (hereinafter module 400) according to one embodiment. The module 400 shown in FIG. 4 can be configured as a pulse-echo slim sonic tool for measuring TTCE. The module 400 can be a 2.25" slim sonic tool that is engineered to decrease the transmitter-to-receiver distance while still operating to make TTCE measurements. While logging axially, cement condition changes outside the casing between the transmitter and receiver positions can be recorded. The difference between signals recorded at adjacent depths to can be determined to enhance these changes. Because the distance between the transmitter and receivers is short, the vertical cement map resolution is a function of this distance, operating frequency, and spatial sampling rate.

The module 400, as shown in FIG. 4, may include a body 402 (e.g., a cylindrical housing), a monopole transmitter 408, and a pair of cross-dipole transmitters 410, with a ring of receivers 406 (also referred to herein as "hydrophones") disposed between the monopole transmitter 408 and the cross-dipole transmitters 410. The receivers 406 are arranged in axially around a circumference of the cylindrical housing.

While the illustrated module 400 has eight receivers 406, in various embodiments, the module 400 can include any applicable number of receivers 406, e.g. 4 or 36 receivers. The rationale of using a ring of eight receivers 406 is to be able to decompose an applicable borehole measurement into its monopole, dipole and quadrupole, octupole, hexapole etc. components. The ring of eight receivers 406 also can provide azimuthal resolution of 45 degrees.

In one embodiment, the monopole transmitter 408 and the pair of cross-dipole transmitters 410 may be arranged equidistantly (i.e., along the longitudinal axis) from the ring of receivers 406, such that the distance between the center of the monopole transmitter 408 and the ring of receivers 406 can be identical to the distance between the center of the cross-dipole transmitters 410 and the ring of receivers 406. Both X and Y dipoles 410 can be co-located at each logging depth. Therefore, assuming the module 400 is moving toward the left in FIG. 4, the data for the monopole transmitter 408 can be gathered first at the present tool position and the data gathered by the cross-dipole transmitters 410 can be acquired while the cross-dipole transmitters 410 travel with the movement of the module 400 to the current position of the receivers 406. The reciprocal is also true, where the pair of transmitter and receiver positions can be swapped to record a new waveform that is identical. Therefore, these three different measurements can be arranged to probe the same section of the cement outside the casing for joint interpretations and there is no need to do any additional processing or signal interpolation to depth match these three different measurements.

In operation, the monopole transmitter 408 can excite a casing compressional breathing mode and the cross-dipole transmitters 410 can excite a casing flexural mode. The radial borehole resonances can be recorded by the ring of receivers 406 using appropriate firing pulse frequencies. The module 400 signal analysis can be further configured based on tubing eccentricity information. For example, forward simulation assisted inversions can be applied to create a cement map.

Figure 5:
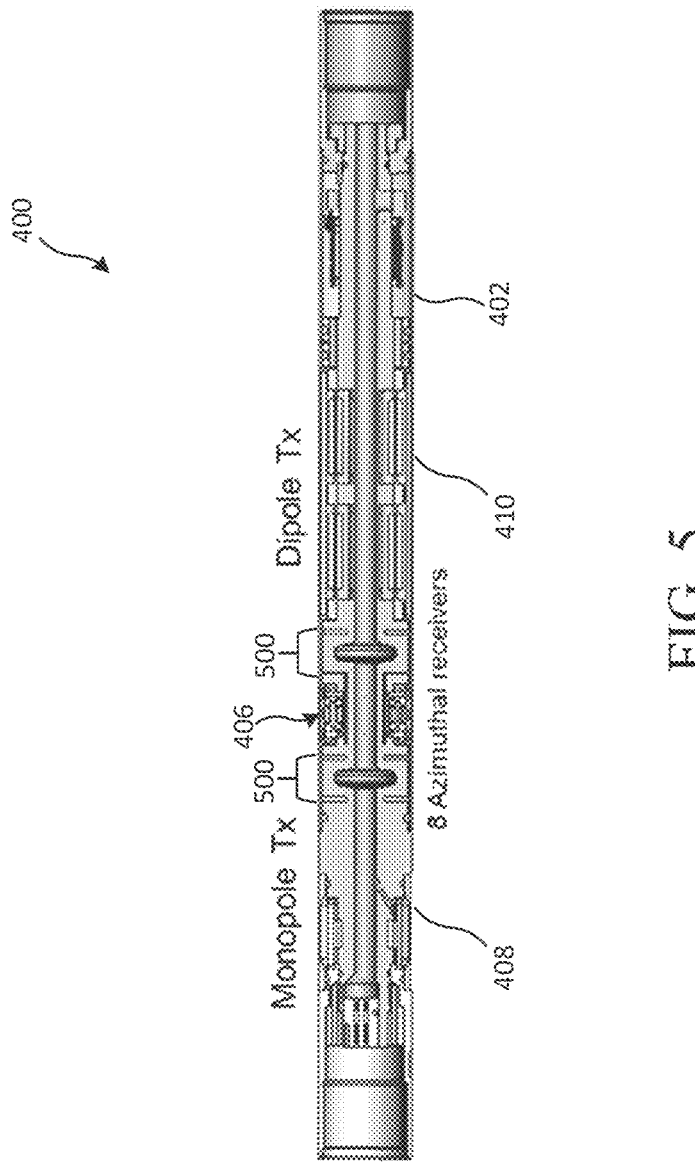
FIG. 5 is a cross-sectional view of the borehole resonance mode measurement module, in accordance with some examples.

FIG. 5 is a cross-sectional view of the module 400, which includes a pair of acoustic isolators 500 having radial cuts and a disk shape cavity between each type of transmitter 408, 410 and the ring of receivers 406. However, the module 400 can be implemented without these isolators 500. An undercut gap beneath each receiver 406 can also prevent or reduce direct tool waves from reaching it. The receivers 406 still have mechanical supports to fit into the 2.25" module 400. The whole transmitters 408, 410 and receiver 406 section can be pressure compensated. Both the monopole 408 and dipole transmitters 410 can be integrated with a dampening technology to broaden bandwidth.

Figures 6A, 6B:
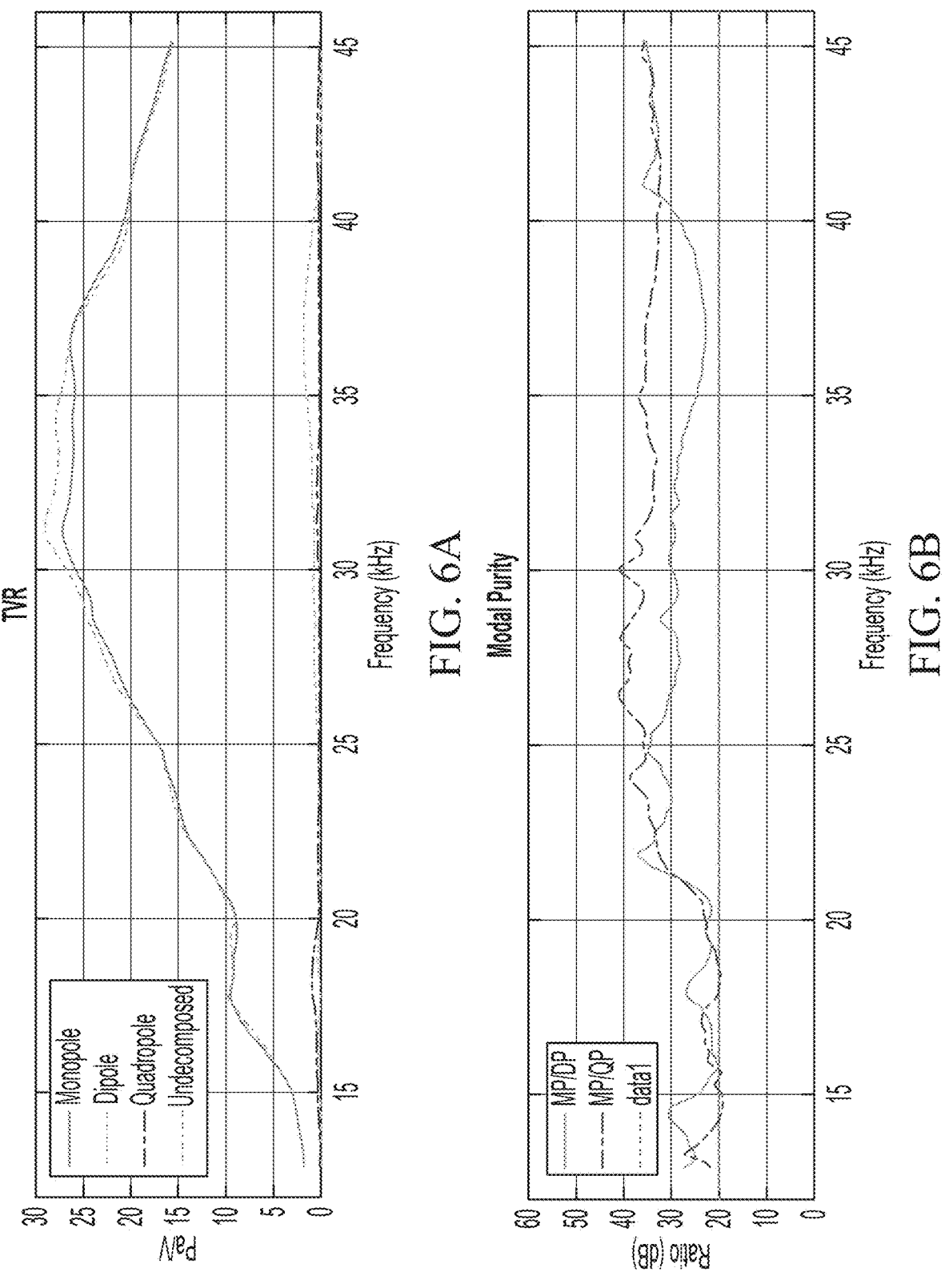
FIGS. 6A and 6B show plots of monopole calibration test results, in accordance with some examples.

FIGS. 6A and 6B show the results of a free field water tank monopole calibration test. As shown, the smaller monopole transmitter still has sufficient bandwidth to cover most borehole resonances regardless of casing and tubing sizes as well as their corresponding higher order modes.

As shown, the monopole transmitter has a bandwidth from about 10 kHz to about 45 kHz. The curves in the plots shown in FIGS. 6A and 6B include decomposed components of an undecomposed monopole radiation and other higher impurity modes which are small to indicate the purity of this monopole acoustic radiation.

Figure 7:
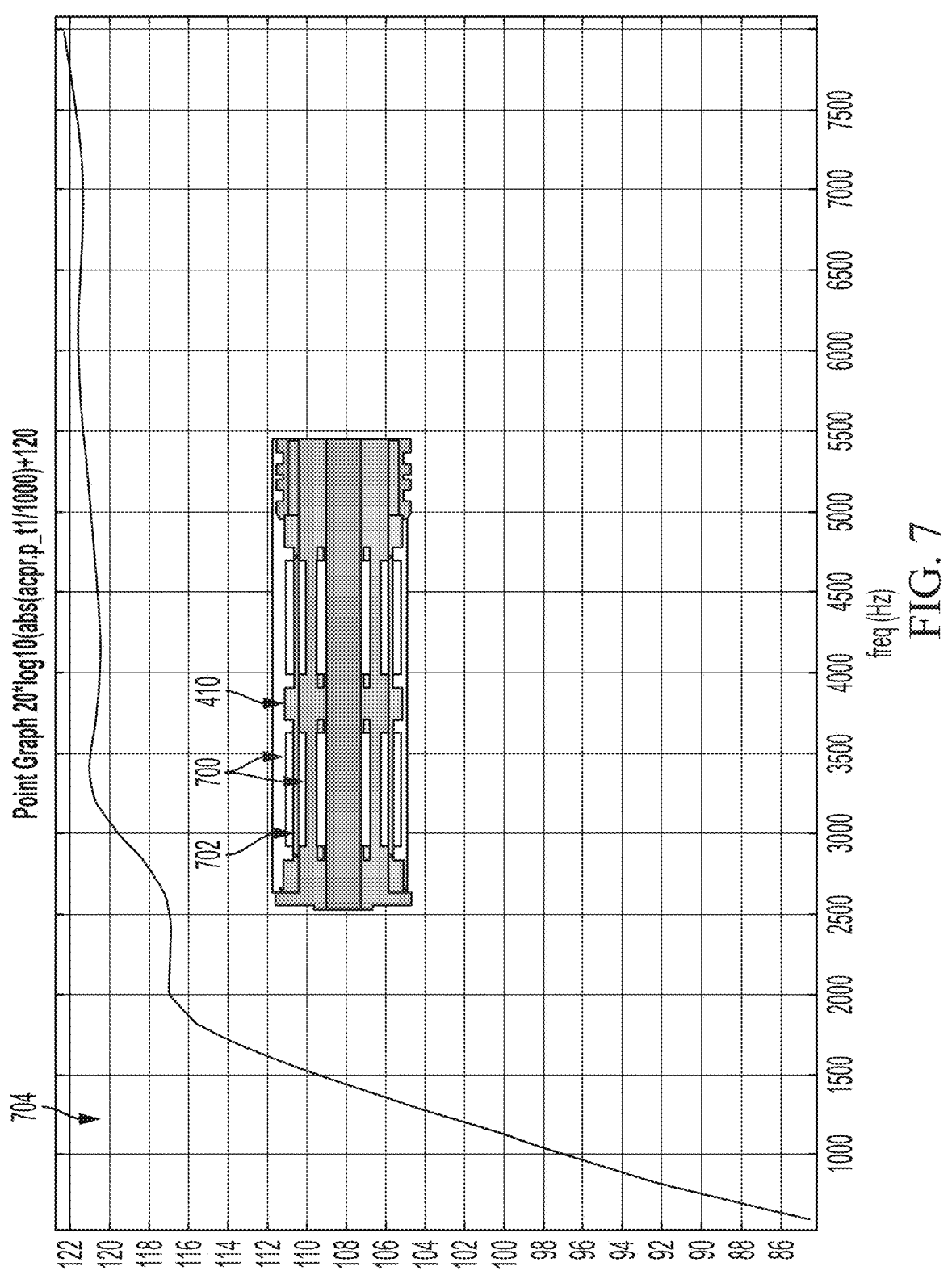
FIG. 7 is the simulated dual bender bar pressure output for the pulse-echo borehole resonance mode measurement module, in accordance with some examples.
Figures 8A, 8B:
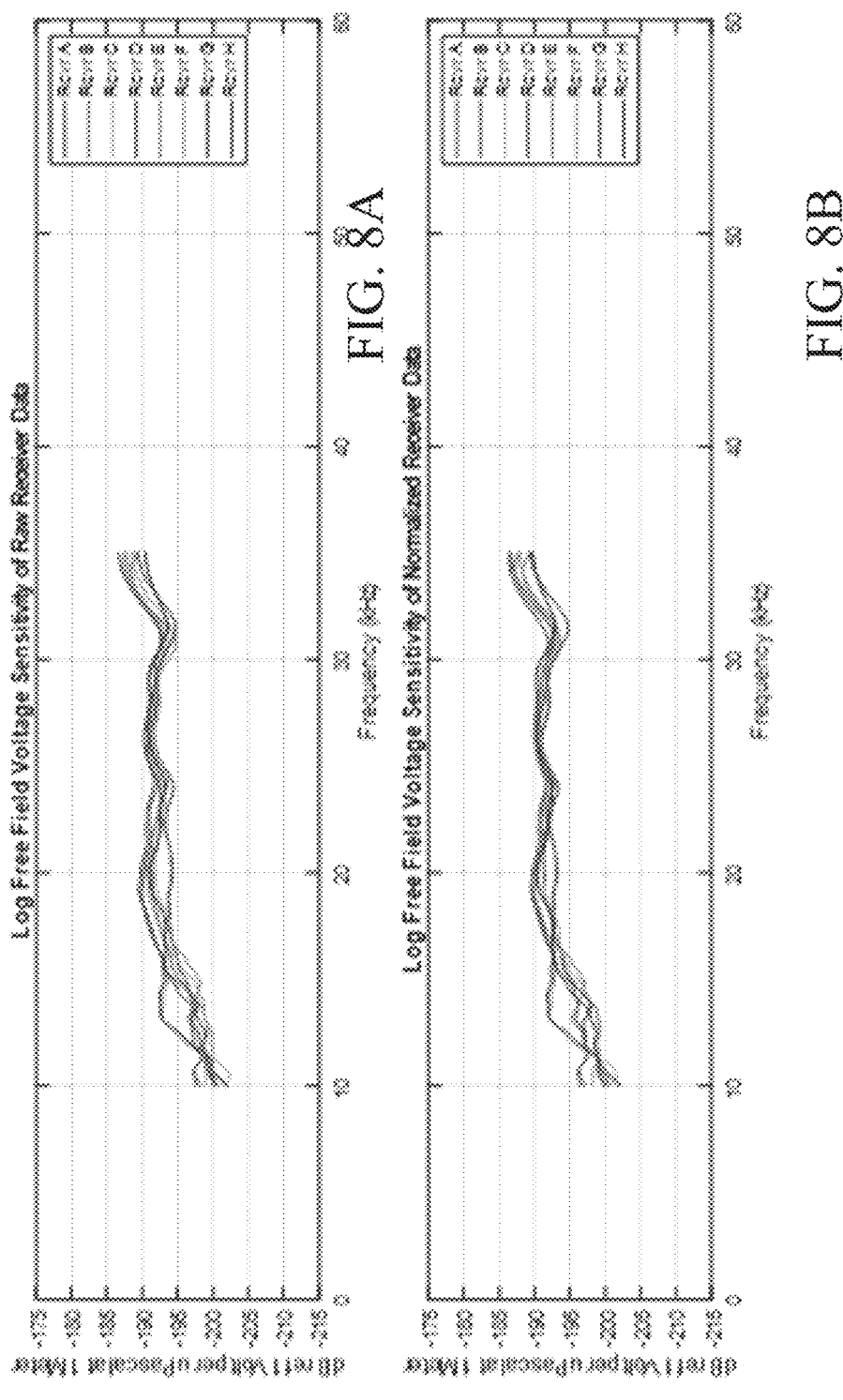
FIGS. 8A and 8B show the typical test results of hydrophones, in accordance with some examples.

Referring to FIG. 7, the X and Y cross-dipole transmitters 410 can use a dual bender technology by putting two rectangular lead zirconate titanate (PZT) plates 700 on each side of a metal substrate 702 to enhance the pressure output. FIG. 7 also includes a graph 704 illustrating simulated dual bender bar pressure output for the module 400 of FIG. 4. The resonance can be designed at 3.3 kHz to cover large casing needs. The picture in the plot shown in FIG. 7 is a cross-sectional view of an example bender transmitter.

FIGS. SA and 8B show typical test results of the receivers 406. As shown, a group of eight receivers 406 has a bandwidth between about 10 kHz to about 35 kHz. However, not demonstrated in these figures is that the receivers 406 can have a bandwidth from about 100 Hz to about 100 kHz using illuminating transmitters in both lower and higher frequency regions. This group calibration test result can also be used to select hydrophones which have a better sensitivity agreement.

As described previously, the disclosed technology can form a slim hole acoustic tool with two measurement modules, which can operate independently from each other and in combination. The first measurement module is the borehole resonance mode measurement module 400, as shown in FIGS. 4-8B. The other measurement module can be a module that is capable of making pitch-catch array measurements, as described hereafter.

Figure 9:
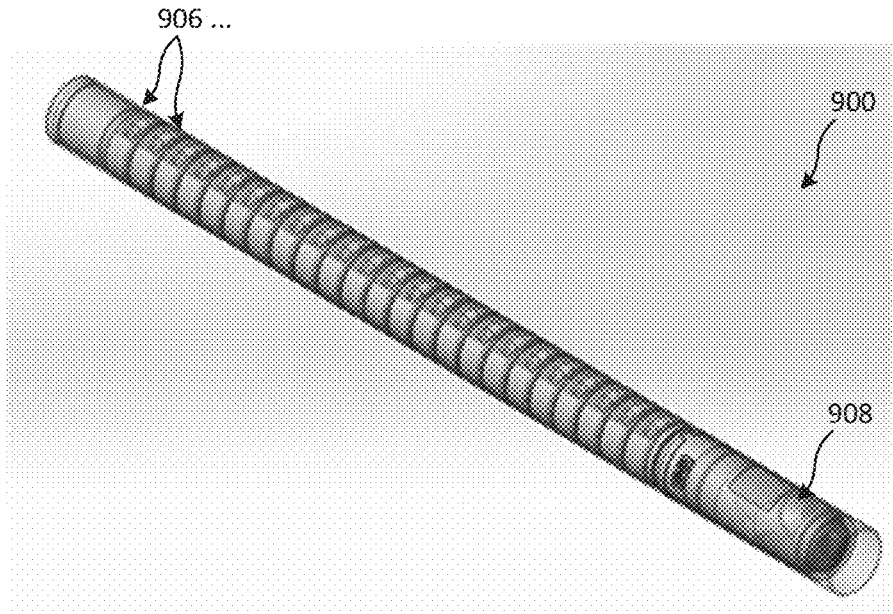
FIG. 9 shows a perspective view of a pitch-catch measurement module having a dense acoustic array that can be integrated with the borehole resonance mode measurement module, in accordance with some examples.

FIG. 9 shows a perspective view of a TTCE pitch-catch measurement module 900 (also referred to herein as module 900 or dense acoustic array module 900) that can be combined with the TTCE borehole resonance mode measurement module 400. In one embodiment, the module 900 has an angled transmitter 908 at one end and 23 receivers 906 spaced, for example, at one-inch distance between neighbors. While 23 receivers are shown, the module 900 can include any applicable number of receivers 906.

In cement evaluation, 360 degrees of cement information is needed. Therefore, there is a motor section (shown hereafter) above the module 900 to take several angular measurements corresponding to different azimuthal angles. The bandwidth of the receivers 906 listed above overlaps with most typical sonic measurement ranges. Both modules 400, 900 can work independently of each other unless there are interfering signals due to borehole reverberations. The measurements of the modules 400, 900 may then be arranged in time sequence without worrying about the possibility of signal contaminations.

Figure 10:
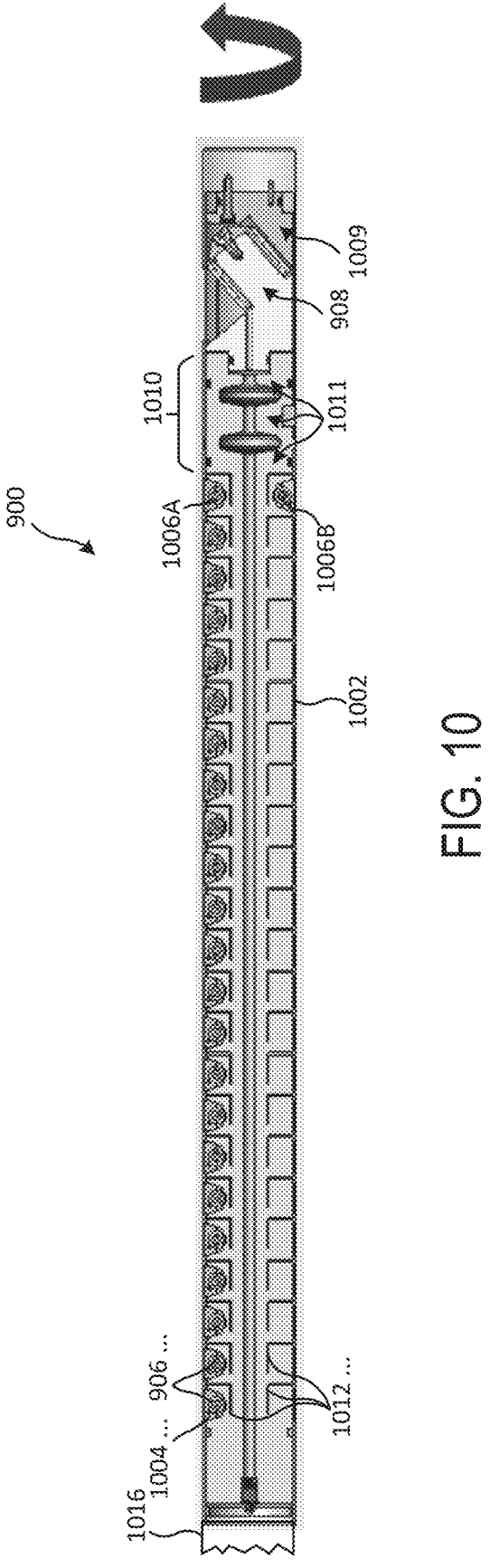
FIG. 10 is a cross-sectional view of the pitch-catch measurement module.

FIG. 10 illustrates a cross-sectional view of an exemplary pitch-catch measurement module 900 having a dense receiver array in accordance with aspects of the present disclosure. In some implementations, the module 900 can be embodied as a slim (e.g., less than or equal to 2.25" outer diameter) through tubing cement evaluation (TTCE) tool. The module 900 can include a body 1002 (e.g., a 3D-printed tool structure including a cylindrical housing) that can house a plurality (e.g., twenty-three) of unipolar, broad-bandwidth (e.g., about 1 kHz to over 100 kHz) unipolar receivers 906, collectively referred to as a "receiver array." In some embodiments, there may be a one-inch spacing between each of the receivers 906 in a longitudinal direction. In other implementations, more or fewer unipolar receivers 906 and/or different spacings can be utilized by the module 900 as described herein and understood by a person of ordinary skill in the art. The module 900 can also include unipolar transmitter 908 having a bandwidth, for example, between about 1 kHz and 150 kHz. The transmitter 908 may be angled (tilted), with respect to the longitudinal axis of the module 900, in a range of about 15 degrees to 45 degrees.

In one embodiment, an acoustic collimator 1009 wraps around the angled transmitter 908. The acoustic collimator 1009 may have a high acoustic impedance contrast that converts the angled transmitter 908, which is a monopole transmitter, into a directional transmitter at higher frequencies. The acoustic collimator 1009 may be wedge-shaped (i.e., have a wedge-shaped cross-section) and comprise a non-uniform thickness solid metal that can wrap around the angled transmitter 908.

The 3D-printed body 1002 can be configured to provide acoustic isolation between the transmitter 908 and the receivers 906 to effectively reject direct TTCE tool waves. An acoustic isolation mechanism 1010 can be provided between the transmitter 908 and the first receiver 1006A. The acoustic isolation mechanism 1010 can include gaps or cavities 1011 that may be substantially perpendicular to the module 900 axis to reflect direct tool waves generated by the transmitter 908. Alternatively or in addition, the module 900 can include or form a set of acoustic isolators 1012 to further block direct tool waves and secondary tool waves introduced by borehole waves that travel along and outside the receiver structure. In some embodiments, the acoustic isolators 1012 may have an L-shaped cross-section, which introduces gaps and cavities in order to isolate the receivers 906 from any tool waves regardless that they are directly or indirectly excited by the transmitter.

In some implementations, the module 900 can include receiver mass blocks 1004 that support the receivers 906. The receiver mass blocks 1004 can include cylindrical gaps that limit contact between each mass block and a central supporting rod (not shown) to stop tool wave propagation across each mass block 1004 and to contain tool waves within each receiver mass block 1004 if tool waves are introduced by borehole propagating waves. Due to the limited contact area of the tool waves traveling along the supporting rod (also referred to herein as a "load bearing shaft"), the module 900 can only allow small amounts of acoustic energy across the junction, which can barely reach the receivers 906 mounted on the module 900.

To prevent spatial aliasing and to catch casing reflections from changing target distances, the module 900 can include, as noted above, a receiver array with each of the receivers 906 being spaced apart by a particular distance (e.g., approximately one-inch). In such examples, the module 900 may not miss reflected signal events by the outer casing, especially when tubing is highly decentered. With a short receiver distance, the receivers 906 of the module 900 may be smaller or include a special orientation to allow for the one-inch distance, without compromising sensitivity.

In some examples, three types of measurements can be determined by the module 900. First, the module 900 can measure ultrasonic pitch-catch measurements by utilizing the angled transmitter 908 and unipolar receivers 906 positioned near (proximal to) the transmitter 908. Second, the module 900 can measure sonic pitch-catch measurements using receivers 906 that may be positioned further away (distal) from the transmitter. Third, the module 900 can include additional receivers (e.g., 1006B) that are positioned opposite to the first receiver 1006A to facilitate dipole and monopole resonant mode measurements (receivers 1006A-B form a dipole). With the one-inch receiver spacing, which could not be achieved previously, the module 900 can be short and light to measure borehole acoustic signals without being disturbed by spatial aliasing that may be introduced by high operating frequencies.

In some embodiment, the pitch-catch measurement module 900 can rotate by a motor 1016 to provide azimuthal acoustic measurements. The motor 1016 can also be at the opposite end of module 400. In some embodiments (shown in FIG. 11), the motor 1016 may rotate only the angled transmitter 908 or only the receiver array. In such embodiments, a ring of receivers 906 may be positioned radially around the longitudinal axis of the module 900 in order to make azimuthal acoustic measurements. For example, a ring of four, six, eight, or more receivers 906 may be used in some embodiments.

In certain implementations, the module 900 can be a 2.25-inch outer diameter (OD) acoustic tool that can combine both pitch-catch ultrasonic and sonic pitch-catch measurements. The module 900 can enable multiple independent cement defect detection answers and their physical agreements, which can further improve cement map accuracy and reliability.

As described herein, the module 900 can evaluate cement quality behind an outside casing, which can generate significant financial incentives that reduce time and risk of plugging and abandoning an aged well for oil companies. Most aged wells have tool deployment restrictions along the well. The module 900 addresses this limitation by providing a slim acoustic tool that can evaluate cement conditions regardless of tubing and casing sizes.

If there is a 2.25-inch tool OD requirement, it is not a simple engineering task to shrink down current acoustic tool sizes in proportion to the OD requirement. Such challenges include: shrinking a receiver and transmitter will lose its sensitivity and/or acoustic radiating output, as well as shifting its operating bandwidth to a higher frequency; the mechanical pulling strength required by the operation will remain static; acoustic isolators may not function due to new tool dimensions; there is limited capacity to include an azimuthal receiver array; combining ultrasonic and sonic tool functions into a single sound as well as using a single transmitter to cover both frequency ranges has never been achieved before, etc.

The systems and methods described herein can determine acoustic measurements that are sensitive enough to evaluate cement behind a casing. For example, in some implementations, the systems and methods can utilize casing SO and AO propagating modes; third interface echoes including both low and high frequencies; and pulse-echo borehole resonance modes. The third interface echo can be performed by an ultrasonic pitch-catch measurement. The SO and AO can also be measured by a sonic tool. Furthermore, the module 900 can include an azimuthal measurement capability.

In some implementations, the module 900 can satisfy pulling strength and azimuthal measurement requirements by rotating the module 900 without compromising the module's mechanical strength and receiver quality, as well as its sensitivity. For example, while rotating, the module 900 can sample every 10 degrees to obtain a perfectly match thirty-six azimuthal receiver responses.

In other implementations, the module 900 can include unipolar transmitters that can perform ultrasonic pitch-catch measurements as well as sonic pitch-catch measurements. The unipolar receivers 906 can utilize a bandwidth that covers both ultrasonic and sonic frequency ranges.

Figure 11:
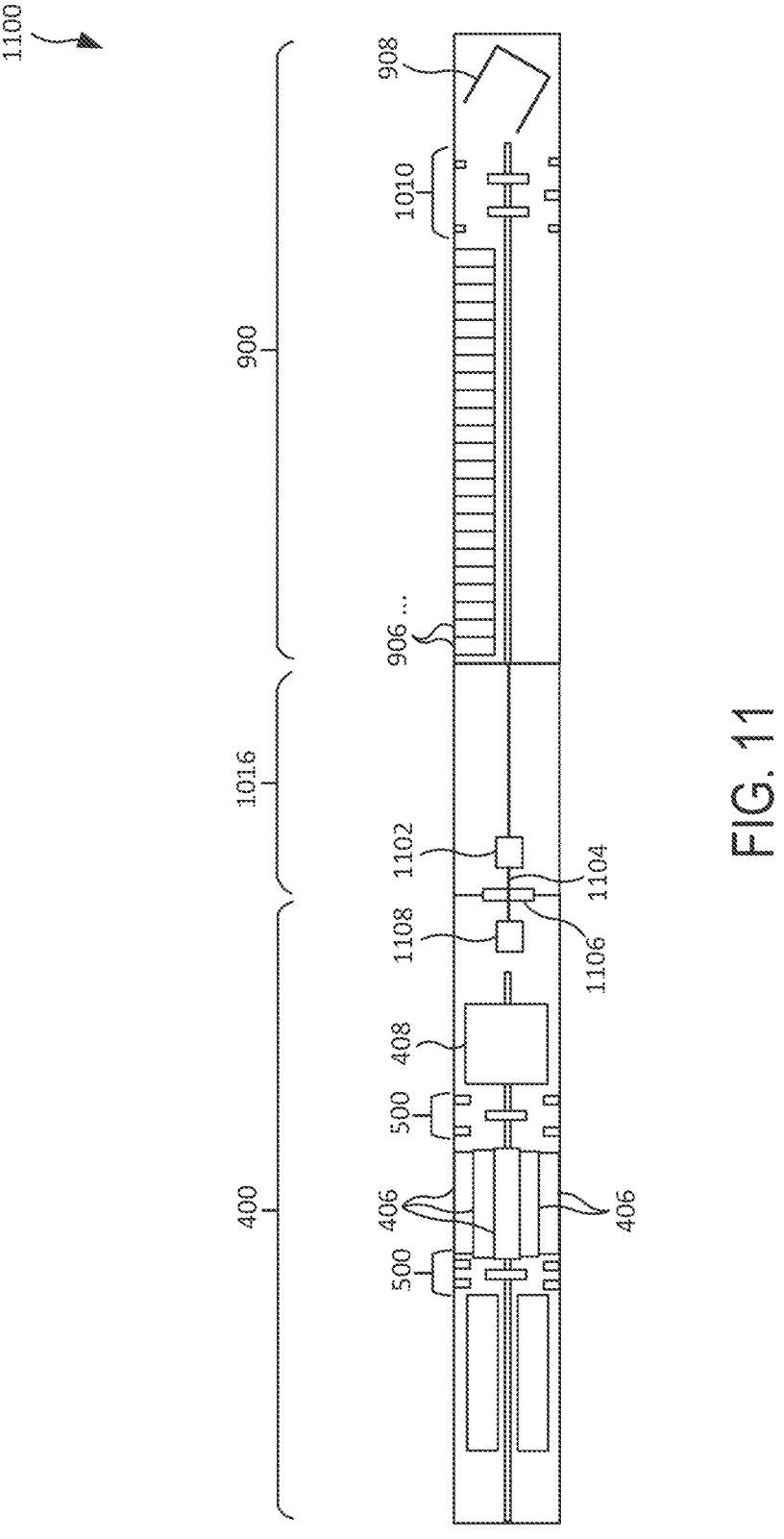
FIG. 11 illustrates a slim sonic logging tool that combines the borehole resonance mode measurement module and the pitch-catch measurement module.

FIG. 11 illustrates a slim sonic logging tool 1100 that combines the borehole resonance mode measurement module 400 and the pitch-catch (dense array) measurement module 900. As noted earlier, the modules 400, 900 may operate independently to perform their respective measurements. However, the modules 400, 900 may be used in concert as well. For example, the monopole transmitter 408 the resonance mode measuring module 400 may be used with the dense array of receivers 906 in the pitch-catch measurement module 900 to perform traditional acoustic logging functions without the need to provide a separate tool. During this mode of operation, the ring of receivers 406 in the resonance mode measuring module 400 and the transmitter 908 in the pitch-catch measurement module 900 might not be used.

In some embodiments, the cross-dipole transmitter 410 may excite, and the array of receivers 906 capture, borehole guided waves such as, for example and without limitation, flexural waves for wireline (WL) logging, screw waves for logging while drilling (LWD) logging, and leaky-P waves for soft formation logging. The captured borehole guided waves can then be used to measure acoustic properties of the formation 308 shown in FIG. 3, including formation body compressional slowness and body shear wave slowness.

As noted earlier, the motor 1016 may rotate the pitch-catch (dense acoustic array) measurement module 900 in some embodiments. The motor 1016 may include a controller 1102 for controlling the motor 1016 and tracking the angular position of the motor axis. The motor 1016 can also be configured to pass one or more synchronization wire(s) 1104 through a slip ring 1106 to a controller below 1108 as well as to other tool module hanging below the module 400. As a result, the firing of the transmitter 408 in the module 400 and capture by the receivers 906 in the module 900 module can be synchronized at a chosen angular sampling rate, e.g. using applicable firmware. Angular samples of 8, 16, 24, etc., can be gathered per rotation to surpass any existing slim sonic tool in terms of number of available azimuthal receivers. The matching between different azimuthal receivers is no longer an issue due to the use of the same hydrophone (receiver 906) at different angular data acquisition points. In some embodiments, the synchronization wire(s) 1104 may be a type of synchronization link, including a wireless link in other embodiments, between the motor 1016 and the module 400.

Due to tool rotation and well deviation, strong inline centralizers, as known in the art, can be used to reduce tool vibrations as well as for keeping the module 900 centralized to ensure measurement repeatability and data quality for different logging paths. In some embodiments, the module 900 can use a plurality of centralizers to keep the tool centered inside either a cased borehole or tubing.

In some embodiments, the tool 1100 can be configured to facilitate communication to synchronize transmitter firing in one acoustic measurement module 400 or 900 and array receiver recording in another acoustic module 900 or 400. This can be done through a direct wire communication (or wirelessly) between the two modules or tools.

With respect to tool reliability, the transmitter (e.g., transmitter 408) can be operated in the stationary acoustic module (e.g., module 400) to avoid a high voltage line going through a slip ring positioned inside the motor section. This makes it easier to maintain the health of the slip ring over a long period of life.

Noises generated by bearings from a centralizer (not shown) and motor 1016 can be minimized and controlled to either move the noises outside of the frequency band of interest or to minimize the amplitudes of the noises to acceptable levels. This can be implemented through either or both low noise bearings and acoustic dampening. Operationally, slower logging speed as well as a lower motor rotation speed can also help to reduce their acoustic noises.

Additionally, either a spacer or an acoustic isolator with through wires can be connection adapted and inserted between the stationary module and rotating module to adjust proper transmit receive spacing suitable for sonic logging measurement. Such transmit receive spacing flexibility can advantageously impact a slim sonic tool 1100 configured to make traditional borehole sonic measurements.

Figure 12:
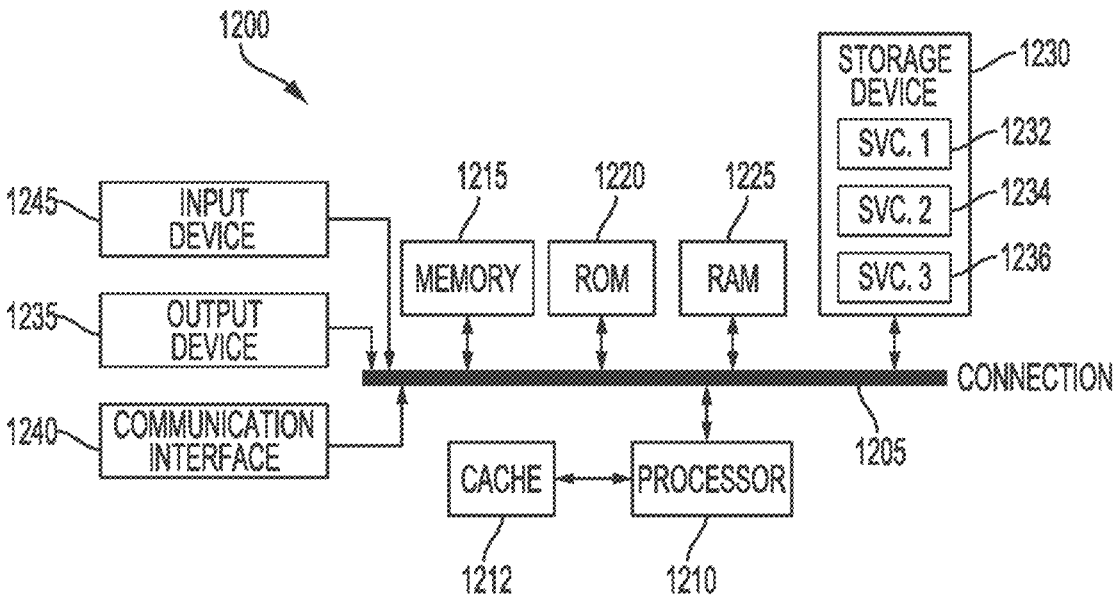
FIG. 12 is a schematic diagram of an example computing device architecture, in accordance with some examples.

FIG. 12 illustrates an example computing device architecture 1200, which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 12 illustrates an example computing device architecture 1200 of a computing device which can implement the various technologies and techniques described herein. For example, the computing device architecture 1200 can implement a gain control system or control system The components of the computing device architecture 1200 are shown in electrical communication with each other using a connection 1205, such as a bus. The example computing device architecture 1200 includes a processing unit (CPU or processor) 1210 and a computing device connection 1205 that couples various computing device components including the computing device memory 1215, such as read only memory (ROM) 1220 and random-access memory (RAM) 1225, to the processor 1210.

The computing device architecture 1200 can include a cache of high-speed memory connected directly with, in close proximity to, or integrated as part of the processor 1210. The computing device architecture 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other computing device memory 1215 may be available for use as well. The memory 1215 can include multiple different types of memory with different performance characteristics. The processor 1210 can include any general-purpose processor and a hardware or software service, such as service 1 1232, service 2 1234, and service 3 1236 stored in storage device 1230, configured to control the processor 1210 as well as a special-purpose processor where software instructions are incorporated into the processor design. The processor 1210 may be a self-contained system, containing multiple cores or processors, a bus, memory controller, cache, etc. A multi-core processor may be symmetric or asymmetric.

To enable user interaction with the computing device architecture 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art, such as a display, projector, television, speaker device, etc. In some instances, multimodal computing devices can enable a user to provide multiple types of input to communicate with the computing device architecture 1200. The communications interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof. The storage device 1230 can include services 1232, 1234, 1236 for controlling the processor 1210. Other hardware or software modules are contemplated. The storage device 1230 can be connected to the computing device connection 1205. In one aspect, a hardware module that performs a particular function can include the software component stored in a computer-readable medium in connection with the necessary hardware components, such as the processor 1210, connection 1205, output device 1235, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, n multi-processor systems, m microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statement 1. A borehole acoustic logging tool, comprising: a resonance mode measurement module including: a first cylindrical housing including a longitudinal axis; a first monopole transmitter disposed within the first cylindrical housing; a pair of cross-dipole transmitters disposed within the first cylindrical housing; and a ring of receivers disposed between the first monopole transmitter and the pair of cross-dipole transmitters within the first cylindrical housing, the ring of receivers being axially arranged around a circumference of the first cylindrical housing.

Statement 2. The borehole acoustic logging tool of statement 1, further comprising: a pitch-catch measurement module including: a second cylindrical housing including the longitudinal axis; a second monopole transmitter disposed within the second cylindrical housing; and a receiver array including a plurality of receivers disposed within the second cylindrical housing, each receiver of the plurality of receivers being positioned at a different distance from the second monopole transmitter; a motor to rotate the resonance mode measurement module relative to the pitch-catch measurement module; a synchronization link between the motor and the resonance mode measurement module; and one or more processors that use the synchronization link to control the motor and track an angular position of an axis of the motor to synchronize firing of the first monopole transmitter of the resonance mode measurement module with capture by the receiver array of the pitch-catch measurement module to receive acoustic logging data at the receiver array at a selected angular sampling rate.

Statement 3. The borehole acoustic logging tool of statements 1-2, wherein the synchronization link comprises one or more wires passing from the motor to pitch-catch measurement module through a slip ring.

Statement 4. The borehole acoustic logging tool of statements 1-3, wherein the first monopole transmitter of the resonance mode measurement module is operable to excite borehole guided waves including at least one of flexural waves for wireline (WL) logging, screw waves for logging while drilling (LWD) logging, and leaky-P waves for logging a soft formation, and wherein the receiver array is operable to capture the borehole guided waves to measure acoustic properties of a formation.

Statement 5. The borehole acoustic logging tool of statements 1-4, wherein the second monopole transmitter is angled with respect to the longitudinal axis within a range of about 15 degrees to about 45 degrees.

Statement 6. The borehole acoustic logging tool of statements 1-5, wherein the second monopole transmitter has a bandwidth between about 1 kHz and 150 kHz.

Statement 7. The borehole acoustic logging tool of statements 1-6, wherein the receiver array includes twenty-three unipolar receivers spaced one inch apart along the longitudinal axis.

Statement 8. The borehole acoustic logging tool of statements 1-7, further comprising at least one acoustic isolator positioned between the second monopole transmitter and a first receiver of the receiver array.

Statement 9. The borehole acoustic logging tool of statements 1-8, further comprising a plurality of acoustic isolators having an L-shaped cross-section, each acoustic isolator isolating a respective one of the plurality of receivers from the second monopole transmitter.

Statement 10. The borehole acoustic logging tool of statements 1-9, further comprising an acoustic collimator that wraps around at least a portion of the second monopole transmitter, the acoustic collimator having a high impedance contrast to convert the second monopole transmitter into a directional transmitter.

Statement 11. The borehole acoustic logging tool of statements 1-10, wherein the motor rotates the pitch-catch measurement module around the longitudinal axis to facilitate azimuthal acoustic measurements using the second monopole transmitter and the receiver array.

Statement 12. The borehole acoustic logging tool of statements 1-11, wherein the first cylindrical housing and the second cylindrical housing are less than or equal to 2.25 inches in diameter.

Statement 13. The borehole acoustic logging tool of statements 1-12, wherein the resonance mode measurement module and pitch-catch measurement module are independently operable to obtain resonance mode measurements and pitch-catch measurements, respectively.

Statement 14. The borehole acoustic logging tool of statements 1-13, wherein the resonance mode measurement module and pitch-catch measurement module are each operable through tubing cement condition (TTCE).

Statement 15. The borehole acoustic logging tool of statements 1-14, wherein the first monopole transmitter is to excite a casing compressional breathing mode, and wherein the pair of cross-dipole transmitters is to excite a casing flexural mode.

Statement 16. The borehole acoustic logging tool of statements 1-15, wherein the pair of cross-dipole transmitters include two cross-dipole transmitters.

Statement 17. The borehole acoustic logging tool of statements 1-16, wherein a center of the ring of receivers is positioned equidistantly from a center of the first monopole transmitter and the pair of cross-dipole transmitters.

Statement 18. The borehole acoustic logging tool of statements 1-17, wherein the ring of receivers is acoustically isolated from the first monopole transmitter and the pair of cross-dipole transmitters.

Statement 19. The borehole acoustic logging tool of statements 1-18, wherein the first monopole transmitter has a bandwidth between about 10 kHz to about 45 kHz.

Statement 20. The borehole acoustic logging tool of statements 1-19, wherein each of the pair of cross-dipole transmitters comprises a metal substrate between two rectangular lead zirconate titanate (PZT) plates.

Statement 21. The borehole acoustic logging tool of statements 1-20, wherein the ring of receivers comprises eight receivers.

The disclosures shown and described above are only examples. Even though numerous characteristics and advantages of the present technology have been set forth in the foregoing description, together with details of the structure and function of the present disclosure, the disclosure is illustrative only, and changes can be made in the detail, especially in matters of shape, size and arrangement of the parts within the principles of the present disclosure to the full extent indicated by the broad general meaning of the terms used in the attached statements. It will therefore be appreciated that the embodiments described above can be modified within the scope of the appended claims.

What is claimed is:

1. A borehole acoustic logging tool, comprising:
a resonance mode measurement module including:
  a first cylindrical housing including a longitudinal axis;
  a first monopole transmitter disposed within the first cylindrical housing;
  a pair of cross-dipole transmitters disposed within the first cylindrical housing; and
  at least one ring of receivers disposed between the first monopole transmitter and at least one cross-dipole transmitter of the pair of cross-dipole transmitters within the first cylindrical housing, the ring of receivers being azimuthally arranged around a circumference of the first cylindrical housing, and the receivers, the first monopole transmitter and the pair of cross-dipole transmitters are placed to ensure a quasi-vertical resolution with respect to the logging tool.

2. The borehole acoustic logging tool of claim 1, further comprising:
a pitch-catch measurement module including:
  a second cylindrical housing including the longitudinal axis;
  a second monopole transmitter disposed within the second cylindrical housing; and
  a receiver array including a plurality of receivers disposed within the second cylindrical housing, each receiver of the plurality of receivers being positioned at a different distance from the second monopole transmitter;
a motor to rotate the resonance mode measurement module relative to the pitch-catch measurement module;
a synchronization link between the motor and the resonance mode measurement module; and
one or more processors that use the synchronization link to control the motor and track an angular position of an axis of the motor to synchronize firing of the first monopole transmitter of the resonance mode measurement module with capture by the receiver array of the pitch-catch measurement module to receive acoustic logging data at the receiver array at a selected angular sampling rate.

3. The borehole acoustic logging tool of claim 2, wherein the synchronization link comprises one or more wires passing from the motor to pitch-catch measurement module through a slip ring.

4. The borehole acoustic logging tool of claim 2, wherein the first monopole transmitter of the resonance mode measurement module is operable to excite borehole guided waves including at least one of flexural waves for wireline (WL) logging, screw waves for logging while drilling (LWD) logging, and leaky-P waves for logging a soft formation, and wherein the receiver array is operable to capture the borehole guided waves to measure acoustic properties of a formation.

5. The borehole acoustic logging tool of claim 2, wherein the second monopole transmitter is angled with respect to the longitudinal axis within a range of about 15 degrees to about 45 degrees.

6. The borehole acoustic logging tool of claim 2, wherein the second monopole transmitter has a bandwidth between about 1 kHz and 150 kHz.

7. The borehole acoustic logging tool of claim 2, wherein the receiver array includes twenty-three unipolar receivers spaced one inch apart along the longitudinal axis.

8. The borehole acoustic logging tool of claim 2, further comprising at least one acoustic isolator positioned between the second monopole transmitter and a first receiver of the receiver array.

9. The borehole acoustic logging tool of claim 2, further comprising a plurality of acoustic isolators having an L-shaped cross-section, each acoustic isolator isolating a respective one of the plurality of receivers from the second monopole transmitter.

10. The borehole acoustic logging tool of claim 2, further comprising an acoustic collimator that wraps around at least a portion of the second monopole transmitter, the acoustic collimator having a high impedance contrast to convert the second monopole transmitter into a directional transmitter.

11. The borehole acoustic logging tool of claim 2, wherein the motor rotates the pitch-catch measurement module around the longitudinal axis to facilitate azimuthal acoustic measurements using the second monopole transmitter and the receiver array.

12. The borehole acoustic logging tool of claim 2, wherein the first cylindrical housing and the second cylindrical housing are less than or equal to 2.25 inches in diameter.

13. The borehole acoustic logging tool of claim 2, wherein the resonance mode measurement module and pitch-catch measurement module are independently operable to obtain resonance mode measurements and pitch-catch measurements, respectively.

14. The borehole acoustic logging tool of claim 2, wherein the resonance mode measurement module and pitch-catch measurement module are each operable to identify a through tubing cement condition (TTCE).

15. The borehole acoustic logging tool of claim 1, wherein the first monopole transmitter is to excite a casing compressional breathing mode, and wherein the pair of cross-dipole transmitters is to excite a casing flexural mode.

16. The borehole acoustic logging tool of claim 1, wherein the pair of cross-dipole transmitters include two cross-dipole transmitters.

17. The borehole acoustic logging tool of claim 1, wherein a center of the ring of receivers is positioned equidistantly from a center of the first monopole transmitter and the pair of cross-dipole transmitters.

18. The borehole acoustic logging tool of claim 1, wherein the ring of receivers is acoustically isolated from the first monopole transmitter and the pair of cross-dipole transmitters.

19. The borehole acoustic logging tool of claim 1, wherein the first monopole transmitter has a bandwidth between about 10 kHz to about 45 kHz.

20. The borehole acoustic logging tool of claim 1, wherein each of the pair of cross-dipole transmitters comprises a metal substrate between two rectangular lead zirconate titanate (PZT) plates.

21. The borehole acoustic logging tool of claim 1, wherein the ring of receivers comprises eight receivers.

* * * * *